Aug. 9, 1927.
B. G. GILBOUGH
1,638,484
AUTOMATIC OIL CUP
Filed May 24, 1926
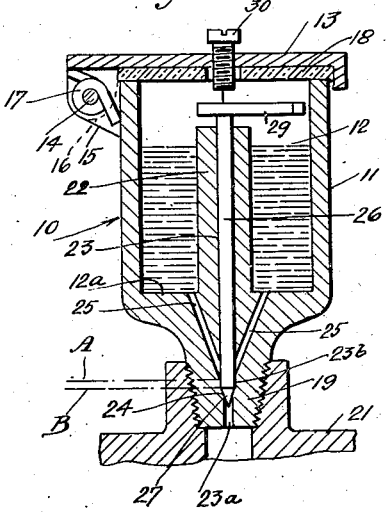
Fig. 1
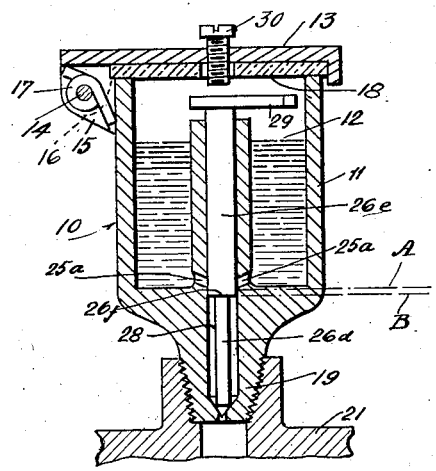
Fig. 3.
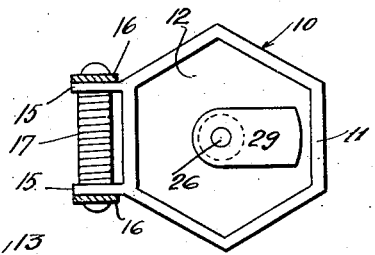
Fig. 2.
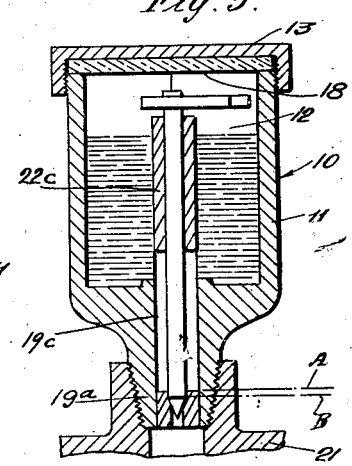
Fig. 5.
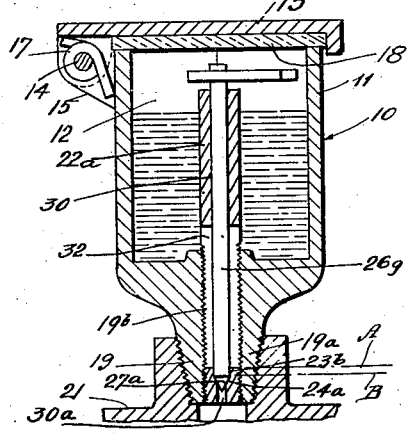
Fig. 4.
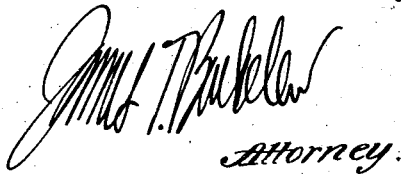
Inventor
Benjamin G. Gilbough.
Attorney.

Patented Aug. 9, 1927.

1,638,484

UNITED STATES PATENT OFFICE.

BENJAMIN G. GILBOUGH, OF LOS ANGELES, CALIFORNIA.

AUTOMATIC OIL CUP.

Continuation in part of application Serial No. 537,700, filed February 20, 1922. This application filed May 24, 1926. Serial No. 111,145.

This application has to do with automatic or self-feeding oil cups, and is a continuation, in part, of an application filed by me February 20, 1922, entitled "Automatic oil cups," Serial No. 537,700.

The cup herein shown and described is of the general type designed to feed a limited amount of lubricant to a movable part, the feed being accomplished by virtue of agitation of the cup during movement of the part. While cups of this nature are adapted for application to many different mechanisms, they are particularly effective in connection with the lubrication of automobile parts, and I will therefore discuss the invention as so applied, though it will be understood this is not to be construed as in any way limiting the invention to this particular application.

Consider, for instance, the lubrication of the spring shackle pins of a motor vehicle. It is very essential that these pins be constantly lubricated, yet it is a matter of common knowledge that the grease cups depended upon for lubricating these pins often go for long periods of time without being turned down, the result being that the shackles go dry. Yet it is not feasible to provide constant feed oil cups for these pins, as will be well understood. Oil cups adapted to feed by virtue of agitation are, however, well suited to the purpose, for while they provide means for constantly supplying lubricant to the pins during operation of the car (which, of course, is the only time the pins need lubrication) they do not flood the bearing or wastefully feed oil during periods when the car is not in motion.

The usual cup having the above mentioned automatic or self-feeding features, depends upon gravity for feeding the oil from cup to bearing, the agitation of the cup merely acting either to open and close a valve in the oil feed line, or to carry up the oil from the main chamber of the cup to the oil feed passageway, whereupon the oil flows by gravity to the part to be lubricated. Often, as for instance, in the case of a spring shackle pin, the parts to be lubricated become incrusted with grit and dirt, or foreign substances gather in the oil feed passageway or line, preventing the proper gravitational flow of oil to the part to be lubricated. I have provided means whereby such a condition may be overcome, this means being in the nature of a plunger moved longitudinally by virtue of agitation of the cup, and adapted to force the feed of oil from cup to the part to be lubricated. While the amount of oil forced by the plunger during a single stroke thereof is very small, it is sufficient for the purpose, and the forced feeding assures that it reaches the point intended.

As a further feature, I provide means whereby the plunger is rotated during its longitudinal movement, this rotation tending to prevent the accumulation of foreign matter between the plunger and the bore through which it reciprocates so there may be no stoppage and no scoring of parts. This rotation also causes even wear on the plunger and bore. I prefer to form the lower end of the plunger so it may act as a valve to shut off the flow of oil from the oil feed passageway when the cup is not being agitated, the valve portion of the plunger being conical and engaging a complementarily formed seat provided at the outlet. The rotation of the plunger therefore also serves to keep this seat clear of accumulated foreign matter, and causes even wear of the seat and valve portion of the plunger or stem, as will be readily understood.

Other objects and novel features of the invention will be made apparent in the following detailed description, reference being had to the accompanying drawings, in which:—

Fig. 1 is a vertical, medial section through a cup embodying my invention;

Fig. 2 is a section on line 2—2 of Fig. 1; and

Figs. 3, 4 and 5 are views generally similar to Fig. 1, but showing variational types of construction.

Referring particularly to Figs. 1 and 2, numeral 10 designates generally an oil cup constructed of any suitable material, and with its body portion 11 preferably polygonal, as viewed in plan, in order that it may more effectively take a wrenching tool. Body portion 11 defines an oil chamber 12, open at its top, there being provided a suitable cover or cap 13 therefor.

While the particular mounting of this cap is unessential to the present invention, I have illustrated the preferred mounting in the form of a hinge connection, hinge pin 14 extending between brackets 15 on body portion 11 and pivotally taking ears 16 which depend from the cap, proper. A coil spring 17 on pin 14 has its opposite ends engaging body 11 and the underside of cap 13 in a manner to hold the cover yieldingly and normally in closed position. Oil is introduced to chamber 12 by raising cover 13, there preferably being a piece of felt or other suitable material 18 secured to the underside of cap 13 and adapted to act as a cushion for the cap as well as to form a tight closure between the top edge of the body portion and the cap. Body portion 11 terminates in a reduced, threaded taper 19 whereby attachment may be made to the part to be lubricated, or to a member leading to or associated with said part, as, for instance, housing or casing 21. A post 22, preferably, though not necessarily, formed integral with body portion 11, extends upwardly from the chamber bottom 12$^a$ through the chamber to a point somewhat below the top edge 11$^a$ of body portion 11. Post 22 has a bore 23 preferably axial, extending throughout its length, the bore continuing through reduced portion 19 to a point adjacent the lower end of said portion, where it tapers to form a conical valve seat 24, the bore portion 23$^a$ below said valve seat being of smaller diameter than the bore above said seat and preferably being concentric therewith. The post 22, with its bores 23 and 23$^a$, constitutes a tubular member, and therefore it is hereinafter referred to as the "oil feed tube."

A plurality of small feed channels or ports 25 extend from bottom 12$^a$ through reduced portion 19 and into communication with bore 23 at a point spaced above tapered seat 24, and these ports may be considered as the inlets to bore 23 which lies below said ports, and which may be termed an "oil feed passageway" 23$^b$. Oil from chamber 12 is free, of course, to flow through ports 25 and into feed passageway 23$^b$, when the former are uncovered, and may then flow or be forced through said passageway and out bore 23$^a$ to the part below to be lubricated. One or more feed ports may be provided, their number and size being governed by the gravity of the oil being handled and, to a certain extent, by the amount it is desired to feed. However, for ordinary purposes, two relatively small ports answer the purpose.

A plunger or valve pin 26 is mounted for longitudinal movement through bore 23, the lower end of the pin being tapered or pointed, as at 27, to fit the taper of seat 24, the seat thus determining the extent of longitudinal movement of the pin through the bore in one direction, and the pin thus being adapted normally to close the outlet from the oil feed passageway and prevent gravitation of oil from the cup to the part to be lubricated. When the cup is agitated longitudinally, however, the pin is intermittently lifted to open the valve.

At least a portion of the oil feed passage, as from A to B, is cylindric, or, expressed otherwise, the passage is cylindric for a distance between its inlet and outlet openings. The valve pin has a portion adapted to fit this cylindric portion closely throughout at least a portion of the longitudinal extent thereof. Consequently, when said closely fitting portion moves longitudinally towards the outlet, it has plunger or piston action through the cylindric portion and forces oil admitted to the oil feed passageway by reason of the pin having been previously raised by agitation of the cup sufficiently to uncover ports 25 through the passageway and outlet and to the part to be lubricated.

The cross-sectional characteristics of that portion of the valve pin which extends above the closely fitting portion, and the cross-sectional characteristics of that portion of bore 23 which extends above the specified cylindric portion, are not important to this invention except that they are such as will allow free longitudinal and rotary movement of the pin and preferably serve to guide the pin in its movement. It will be noted that the valve pin is free to be moved longitudinally without rotation by agitation of the cup longitudinally, and also free to rotate without moving longitudinally. However, I prefer to provide means to cause rotation of the pin by virtue of the transverse agitation of the cup.

The means for causing said rotation is in the form of an eccentric or overhanging weight or arm 29 secured to the upper end of the pin 26 and positioned so, when pointed end 27 engages seat 24, the arm is spaced somewhat below belt 18 and slightly above the top of tube 22. By reason of the spacing from the top of the feed tube, there is no liability of the arm holding pin 26 off seat 24. Arm 29 constitutes a weight for pin 26 so the pin may be considered as being relatively heavy, and by reason of its eccentricity or overhanging characteristics, the arm causes rotation of the pin when the cup is agitated transversely. This rotation of the pin causes even wear between end 27 and seat 24 to insure perfect seating of the valve, and also causes even wear of the cylindric portion of bore 23$^b$ and the closely fitting portion of the pin or plunger so there is less likelihood of scoring one or the other with the result of consequent leakage. The rotation of the pin also tends to prevent the accumulation of foreign matter in the passageway or on the seat. The weighting of the pin also insures that sufficient pressure is exerted thereby to cause a forced feed of oil through the passageway.

A cap screw 30' may be threaded through top 13 and in axial alinement with pin 26, providing adjustable means for limiting the upward longitudinal movement of the pin, thus serving to regulate the stroke of the pin so oil in varying amounts may gravitate into the oil passage when the pin is raised sufficiently to open ports 25 and to vary the drop of the pin so that it may strike the body of oil in the feed passageway with varying force of impact. Preferably, though not necessarily, pin 26 closes inlet ports 25 when the valve is closed.

In the variational forms of the invention shown in the other figures, parts of which are similar to corresponding parts in Fig. 1 are given the same reference numerals.

The construction illustrated in Fig. 3 is generally similar to that shown in Fig. 1, except that pin 26$^e$ is reduced at its lower end 26$^d$ so it does not fit oil feed passageway 28 throughout the entire longitudinal extent of the latter. However, passageway 28 has at least a portion (for instance between lines A and B) which is cylindric, and pin 26$^e$ has a portion 26$^f$ which closely fits this cylindric portion, the cylindric portion being, of course, between inlet ports 25$^a$ and the outlet of the oil feed passageway. The annular space about the reduced portion 26$^d$ of the valve pin insures the free passage of oil therethrough and does much to prevent clogging of the bore.

In the type of construction illustrated in Fig. 4, the cup is generally similar to that shown in Fig. 1, except that there are certain alterations in the structure of oil feed tube 22$^a$. In Fig. 4 this tube consists of a separable member having an axial bore 30 extending throughout its length to a point adjacent its lower end, where it tapers to form a conical seat 24$^a$ and opens to reduced bore 30$^a$. Pin 26$^g$ has a pointed end 27$^a$ adapted to seat on seat 24$^a$. Tube or sleeve 22$^a$ is threaded through bore 19$^b$ in reduced portion 19$^a$.

Oil is free to gravitate from chamber 12 through longitudinal slots 32 in tube 22$^a$, these slots terminating somewhat above seat 24$^a$ and providing the inlets for the oil feed passageway portion 23$^b$, indicated between lines A and B, of the bore of the feed tube. This part of the bore is cylindric, throughout at least a portion of its longitudinal extent, and that part or a portion of that part of pin 26$^g$, which extends into the cylindric portion is closely fitting, so the pin operates as a force feeder in the manner described in connection with Fig. 1. Longitudinal movement of pin 26$^g$ through the bore of the sleeve in one direction is limited by cap 13 and the stroke of the pin may be regulated by axial adjustment of the sleeve, through its threaded connection with the cup, such axial adjustment varying the distance between seat 24$^a$ and cap 13.

The form illustrated in Fig. 5 is identical with that illustrated in Fig. 4, except that oil feed tube 22$^c$ is not externally threaded at its lower end, but rather is adapted to be force-fitted in the smooth bore 19$^c$ of reduced portion 19$^a$. Adjustment of the sleeve, and therefore regulation of the valve pin stroke, may be accomplished by tapping the tube lightly from one end or the other.

It will be understood the drawings and description are to be considered merely as illustrative of and not restrictive on the broader claims appended hereto, for various changes in design, structure and arrangement may be made without departing from the spirit and scope of the claims.

I claim:

1. In an oil cup, the combination of a body with an oil chamber and an oil feed passage therein with an oil outlet at its end, a relatively heavy valve pin longitudinally movable in the passage, an oil inlet opening leading to the passage at a distance from the oil outlet, the passage being cylindric for a distance between the inlet and outlet openings and the valve pin fitting the cylindric passage closely so that when the pin moves longitudinally it has plunger action to force oil through the outlet; the valve pin being free to be moved longitudinally without rotation by agitation of the cup longitudinally and free to rotate without moving longitudinally, and means to cause rotation of the pin by virtue of transverse agitation of the cup.

2. In an oil cup, the combination of a body with an oil chamber and an oil feed passage therein with an oil outlet at its end, a valve seat near the outlet, a relatively heavy valve pin longitudinally movable in the passage, said pin being adapted to engage said seat to close the outlet when the pin is at one limit of its longitudinal movement, an oil inlet opening leading to the passage at a distance from the oil outlet, the passage being cylindric for a distance between the inlet and outlet openings and the valve pin fitting the cylindric passage closely so that when the pin moves longitudinally it has plunger action to force oil through the outlet; the valve pin being free to be moved longitudinally without rotation by agitation of the cup longitudinally and free to rotate without moving longitudinally, and means to cause rotation of the pin by virtue of transverse agitation of the cup.

In witness that I claim the foregoing I have hereunto subscribed my name this 13th day of May, 1926.

BENJAMIN G. GILBOUGH.